(12) United States Patent
Li et al.

(10) Patent No.: US 9,749,721 B2
(45) Date of Patent: Aug. 29, 2017

(54) DATA RECEIVING AND SENDING METHODS AND APPARATUSES AND SYSTEM

(71) Applicant: Huawei Technologies Co., Ltd., Shenzhen, Guangdong (CN)

(72) Inventors: Mo Li, Chengdu (CN); Ning Deng, Shenzhen (CN); Qingsong Xue, Chengdu (CN); Guowei Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/960,703

(22) Filed: Dec. 7, 2015

(65) Prior Publication Data
US 2016/0088373 A1    Mar. 24, 2016

Related U.S. Application Data

(63) Continuation of application No. PCT/CN2013/076999, filed on Jun. 8, 2013.

(51) Int. Cl.
*H04B 10/61* (2013.01)
*H04B 10/50* (2013.01)
(Continued)

(52) U.S. Cl.
CPC ....... *H04Q 11/0003* (2013.01); *H04B 10/541* (2013.01); *H04L 27/0008* (2013.01);
(Continued)

(58) Field of Classification Search
CPC .............................. H04B 10/505; H04B 10/61
See application file for complete search history.

(56) References Cited

U.S. PATENT DOCUMENTS 8,111,776 B1    2/2012  Crawford
8,208,818 B2 *  6/2012  Sasai ...................... H04B 1/707
                                                    398/185
(Continued)

FOREIGN PATENT DOCUMENTS

CN    102413094 A    4/2012
CN    103036845 A    4/2013
(Continued)

OTHER PUBLICATIONS

F. Vacondio et al., "Coherent Receiver Enabling Data Rate Adaptive Optical Packet Networks", Sep. 18-22, 2011, 3 pages.

*Primary Examiner* — Shi K. Li

(57) ABSTRACT

The present invention discloses data receiving and sending methods and apparatuses and a system, and relates to the field of communications technologies. The data receiving method includes: receiving a data carrier; deciding polar radius values of multiple labeled constellation points carried at a pre-determined location in the data carrier, to determine a numerical value indicated by a polar radius value of each labeled constellation point in the multiple labeled constellation points; determining, according to a sequence including numerical values indicated by polar radius values of all the labeled constellation points in the multiple labeled constellation points, a demodulation scheme of a constellation point, other than the multiple labeled constellation points, carried in the data carrier; and demodulating, according to the determined demodulation scheme, the constellation point, other than the multiple labeled constellation points, carried in the data carrier.

18 Claims, 10 Drawing Sheets

(51) Int. Cl.
- *H04Q 11/00* (2006.01)
- *H04L 27/00* (2006.01)
- *H04L 27/22* (2006.01)
- *H04L 27/38* (2006.01)
- *H04B 10/54* (2013.01)
- *H04L 27/20* (2006.01)
- *H04L 27/36* (2006.01)

(52) U.S. Cl.
CPC ............ *H04L 27/22* (2013.01); *H04L 27/38* (2013.01); *H04Q 11/0066* (2013.01); *H04L 27/2067* (2013.01); *H04L 27/361* (2013.01); *H04Q 2011/0077* (2013.01)

(56) References Cited

U.S. PATENT DOCUMENTS

| | | | |
|---|---|---|---|
| 2003/0223507 A1 | 12/2003 | De Gaudenzi et al. | |
| 2010/0150577 A1 | 6/2010 | Essiambre et al. | |
| 2011/0261904 A1* | 10/2011 | Seier | H04L 1/0003 375/298 |
| 2011/0261906 A1 | 10/2011 | Chuang | |

FOREIGN PATENT DOCUMENTS

| | | | |
|---|---|---|---|
| EP | 0 984 595 A1 | 3/2000 | |
| EP | 2 518 925 A1 | 10/2012 | |

\* cited by examiner

DATA RECEIVING AND SENDING METHODS AND APPARATUSES AND SYSTEM

CROSS-REFERENCE TO RELATED APPLICATIONS

This application is a continuation of International Application No. PCT/CN2013/076999, filed Jun. 8, 2013, which is hereby incorporated by reference in its entirety.

TECHNICAL FIELD

The present invention relates to the field of communications technologies, and in particular, to data receiving and sending methods and apparatuses and a system.

BACKGROUND

In a current transport network, when network traffic is to be switched at an intermediate node, first, optical-to-electrical conversion needs to be performed on the network traffic, after the conversion to an electrical domain, electrical switching is performed, and after the switching, electrical-to-optical conversion is performed so that the network traffic is converted back into an optical signal for transmission. The optical-to-electrical-to-optical conversion and the electrical switching in the entire process bring huge additional power consumption and costs to the network. To decrease the power consumption and costs, an all-optical switching technology is proposed. In all-optical switching, network data is carried in a form of an optical burst packet, and therefore at a switching node, switching can be directly completed in an optical domain, and only an optical switching device needs to be retained at the node, which can save a large quantity of optical-to-electrical-to-optical conversion and electrical switching devices, and greatly reduce power consumption and costs of a network.

To support the all-optical switching technology, an optical transceiver in a network is required to be capable of transmitting and receiving an optical signal in a burst form. As a requirement on a network capacity becomes increasingly high, a current commercial 10 G burst optical module using an OOK (On-Off Keying) modulation format cannot meet the requirement, and a high-speed burst receiving and transmitting technology based on a coherence technology begins to be developed in the industry. A hardware structure of a high-speed burst optical module is basically consistent with that of a current commercial continuous-mode coherent optical module, and a main difference lies in a DSP (digital signal processing, Digital Signal Processing) algorithm. For features that a burst signal lasts for a short time and each burst packet has a different characteristic, when a burst DSP algorithm is used, signal demodulation needs to be quickly completed; therefore, most algorithm modules are implemented based on a training sequence, and all are forward algorithms that do not include feedbacks.

In an all-optical switching network, in transferring and switching of an optical burst packet, a format of data carried in the optical burst packet is transparent, and therefore nodes in the network may transmit burst packets in different modulation formats, for example, some transmit burst packets in a QPSK (Quadrature Phase Shift Keying, quadrature phase shift keying) format, and some transmit burst packets in a 16QAM (16 Quadrature Amplitude Modulation, quadrature amplitude modulation in which 16 symbols are included) format, which requires a burst receiver to be capable of supporting receiving and demodulation of burst signals in multiple modulation formats.

The prior art discloses a coherent burst receiver BMR. In the BMR, channel equalization is still implemented by using a constant modulus algorithm CMA that is commonly used in continuous receivers, and only corresponding improvement is made for a burst signal to increase a convergence speed. Because the CMA algorithm is applicable to only an equal-amplitude modulation format (for example, m-PSK), the BMR cannot support receiving of a non-equal-amplitude QAM signal.

SUMMARY

Embodiments of the present invention provide data receiving and sending methods and apparatuses and a system, so as to implement receiving of different-order amplitude modulation signals.

In order to resolve the foregoing technical problem, the following technical solutions are disclosed in the embodiments of the present invention:

According to a first aspect, a data receiving method is provided, including:

receiving a data carrier;

deciding polar radius values of multiple labeled constellation points carried at a pre-determined location in the data carrier, to determine a numerical value indicated by a polar radius value of each labeled constellation point in the multiple labeled constellation points;

determining, according to a sequence including numerical values indicated by polar radius values of all the labeled constellation points in the multiple labeled constellation points, a demodulation scheme of a constellation point, other than the multiple labeled constellation points, carried in the data carrier, where different demodulation schemes correspond to different sequences; and demodulating, according to the determined demodulation scheme, the constellation point, other than the multiple labeled constellation points, carried in the data carrier.

In a first optional manner of the first aspect, the polar radius values of the labeled constellation points are provided, which are distances between the labeled constellation points and a center of a constellation diagram; and the deciding polar radius values of multiple labeled constellation points carried at a pre-determined location in the data carrier specifically includes:

obtaining a location of each labeled constellation point carried at the pre-determined location in the data carrier;

obtaining a distance between each labeled constellation point and a center point of a constellation diagram according to the location of each labeled constellation point; and determining, according to the distance between each labeled constellation point and the center point of the constellation diagram, whether each labeled constellation point falls on a first circle or a second circle, where the first circle and the second circle are concentric circles using the center point of the constellation diagram as a circle center, and a radius of the first circle is greater than a radius of the second circle.

With reference to the first optional manner of the first aspect, in a second optional manner, the determining a numerical value indicated by a polar radius value of each labeled constellation point in the multiple labeled constellation points specifically includes:

when a labeled constellation point in the multiple labeled constellation points falls on the first circle, determining that a numerical value indicated by a polar radius value of the labeled constellation point is a first numerical value; and when a labeled constellation point in the multiple labeled constellation points falls on the second circle, determining that a numerical value indicated by a polar radius value of the labeled constellation point is a second numerical value.

In a third optional manner of the first aspect, the determining, according to a sequence including numerical values indicated by polar radius values of all the labeled constellation points in the multiple labeled constellation points, a demodulation scheme of a constellation point, other than the multiple labeled constellation points, carried in the data carrier specifically includes:

sorting, in a receiving-time order, the numerical values indicated by the polar radius values of all the labeled constellation points in the multiple labeled constellation points, to obtain the sequence; and querying a demodulation scheme table according to the sequence, to determine, according to a query result, the demodulation scheme of the constellation point, other than the multiple labeled constellation points, carried in the data carrier.

In a fourth optional manner of the first aspect, the determining, according to a sequence including numerical values indicated by polar radius values of all the labeled constellation points in the multiple labeled constellation points, a demodulation scheme of a constellation point, other than the multiple labeled constellation points, carried in the data carrier specifically includes:

sorting, in a receiving-time order, the numerical values indicated by the polar radius values of all the labeled constellation points in the multiple labeled constellation points, to obtain the sequence;

performing an exclusive OR operation on the sequence and different standard sequences, and summing bits of results of the exclusive OR operation, to obtain a standard sequence having a minimum summation result; and determining, according to the standard sequence having the minimum summation result, the demodulation scheme of the constellation point, other than the multiple labeled constellation points, carried in the data carrier.

According to a second aspect, a data sending method is provided, including:

generating a series of constellation points including label information, where the label information is a sequence indicated by polar radius values of multiple labeled constellation points at a pre-determined location and in the series of constellation points, the sequence is a sequence corresponding to a modulation scheme of a constellation point, except the multiple labeled constellation points, in the series of constellation points, different modulation schemes correspond to different sequences, a polar radius value of each labeled constellation point in the multiple labeled constellation points indicates a first numerical value or a second numerical value, and the sequence is a sequence including the first numerical value and/or the second numerical value;

adding the series of constellation points to a data carrier; and sending the data carrier.

In a first optional manner of the second aspect, the data carrier is an optical burst packet; and the label information is set in a label field of the optical burst packet, and the label field is located behind a frame header locating field and set before all data block fields.

With reference to the first optional manner of the second aspect, in a second optional manner, the label field includes a pre-determined quantity of pieces of the label information that are the same.

In a third optional manner of the second aspect, the labeled constellation points are modulated by using ASK amplitude shift keying.

According to a third aspect, a data receiving apparatus is provided, including:

a receiving unit, configured to receive a data carrier;

a deciding unit, configured to decide polar radius values of multiple labeled constellation points carried at a pre-determined location in the data carrier, to determine a numerical value indicated by a polar radius value of each labeled constellation point in the multiple labeled constellation points;

a demodulation scheme unit, configured to determine, according to a sequence including numerical values indicated by polar radius values of all the labeled constellation points in the multiple labeled constellation points, a demodulation scheme of a constellation point, other than the multiple labeled constellation points, carried in the data carrier, where different demodulation schemes correspond to different sequences; and a demodulating unit, configured to demodulate, according to the determined demodulation scheme, the constellation point, other than the multiple labeled constellation points, carried in the data carrier.

In a first optional manner of the third aspect, the polar radius values of the labeled constellation points are distances between the labeled constellation points and a center of a constellation diagram; and the deciding unit includes:

a location module, configured to obtain a location of each labeled constellation point carried at the pre-determined location in the data carrier;

a distance module, configured to obtain a distance between each labeled constellation point and a center point of a constellation diagram according to the location of each labeled constellation point;

a fall point module, configured to determine, according to the distance between each labeled constellation point and the center point of the constellation diagram, whether each labeled constellation point falls on a first circle or a second circle, where the first circle and the second circle are concentric circles using the center point of the constellation diagram as a circle center, and a radius of the first circle is greater than a radius of the second circle; and a numerical value module, configured to determine, according to whether each labeled constellation point falls on the first circle or the second circle, the numerical value indicated by the polar radius value of each labeled constellation point in the multiple labeled constellation points.

With reference to the first optional manner of the third aspect, in a second optional manner, the numerical value module is specifically configured to:

when a labeled constellation point in the multiple labeled constellation points falls on the first circle, determine that a numerical value indicated by a polar radius value of the labeled constellation point is a first numerical value; and when a labeled constellation point in the multiple labeled constellation points falls on the second circle, determine that a numerical value indicated by a polar radius value of the labeled constellation point is a second numerical value.

In a third optional manner of the third aspect, the demodulation scheme unit includes:

a sorting module, configured to sort, in a receiving-time order, the numerical values indicated by the polar radius values of all the labeled constellation points in the multiple labeled constellation points, to obtain the sequence; and a table query module, configured to query a demodulation scheme table according to the sequence, to determine, according to a query result, the demodulation scheme of the constellation point, other than the multiple labeled constellation points, carried in the data carrier.

In a fourth optional manner of the third aspect, the demodulation scheme unit includes:

a sorting module, configured to sort, in a receiving-time order, the numerical values indicated by the polar radius values of all the labeled constellation points in the multiple labeled constellation points, to obtain the sequence;

an error correcting module, configured to perform an exclusive OR operation on the sequence and different standard sequences, and sum bits of results of the exclusive OR operation, to obtain a standard sequence having a minimum summation result; and a demodulation determining module, configured to determine, according to the standard sequence having the minimum summation result, the demodulation scheme of the constellation point, other than the multiple labeled constellation points, carried in the data carrier.

According to a fourth aspect, a data sending apparatus is provided, including:

a generating unit, configured to generate a series of constellation points including label information, where the label information is a sequence indicated by polar radius values of multiple labeled constellation points at a pre-determined location and in the series of constellation points, the sequence is a sequence corresponding to a modulation scheme of a constellation point, except the multiple labeled constellation points, in the series of constellation points, different modulation schemes correspond to different sequences, a polar radius value of each labeled constellation point in the multiple labeled constellation points indicates a first numerical value or a second numerical value, and the sequence is a sequence including the first numerical value and/or the second numerical value;

an adding unit, configured to add the series of constellation points to a data carrier; and a sending unit, configured to send the data carrier.

In a first optional manner of the fourth aspect, the data carrier is an optical burst packet; and the label information is set in a label field of the optical burst packet, and the label field is located behind a frame header locating field and set before all data block fields.

With reference to the first optional manner of the fourth aspect, in a second optional manner, the label field includes a pre-determined quantity of pieces of the label information that are the same.

In a third optional manner of the fourth aspect, the labeled constellation points are modulated by using ASK amplitude shift keying.

According to a fifth aspect, a data communications system is provided, including: the data sending apparatus and the data receiving apparatus.

In the data sending and receiving methods and apparatuses and the system in the embodiments of the present invention, on a data receiving apparatus side: a data carrier is received; polar radius values of multiple labeled constellation points carried at a pre-determined location in the data carrier are decided, to determine a numerical value indicated by a polar radius value of each labeled constellation point in the multiple labeled constellation points; a demodulation scheme of a constellation point, other than the multiple labeled constellation points, carried in the data carrier is determined according to a sequence including numerical values indicated by polar radius values of all the labeled constellation points in the multiple labeled constellation points, where different demodulation schemes correspond to different sequences; and the constellation point, other than the multiple labeled constellation points, carried in the data carrier is demodulated according to the determined demodulation scheme. The demodulation scheme of the constellation point other than the multiple labeled constellation points is transferred by using the polar radius values of the labeled constellation points, so that the data receiving apparatus can receive different-order amplitude modulation signals, and perform processing by using corresponding demodulation formats.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

Figure 1:
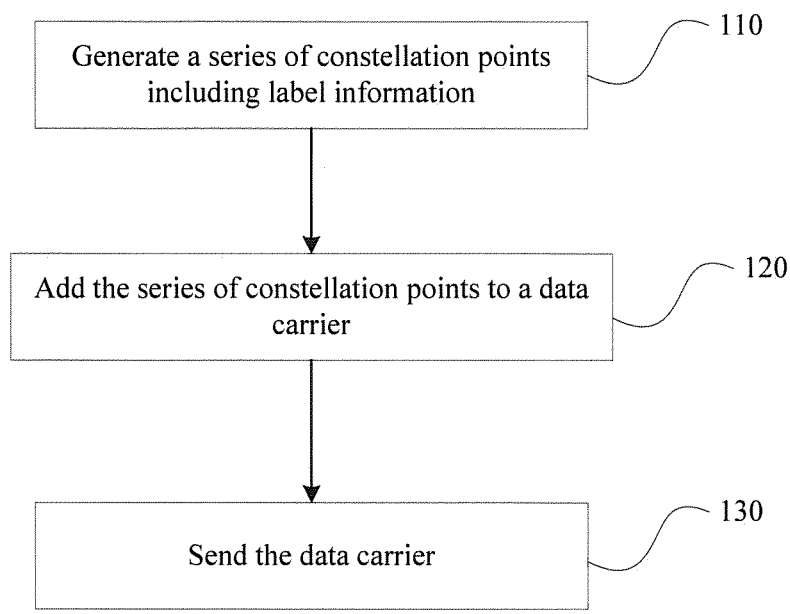
FIG. 1 is a flowchart of a data sending method according to Embodiment 1 of the present invention.

The following embodiments of the present invention provide data receiving and sending methods and apparatuses and a system, so as to implement receiving of different-order amplitude modulation signals.

To make a person skilled in the art understand the technical solutions in the embodiments of the present invention better, and make the foregoing objectives, features, and advantages of the embodiments of the present invention clearer, the following further describes the technical solutions in the embodiments of the present invention in detail with reference to the accompanying drawings.

It should be understood that, units divided in the embodiments of the present invention are functionally defined, based on achieving of the objectives of the present invention, the units may be divided into multiple physical entities, and functions of the multiple units may also be implemented by one physical entity, which is not limited in the embodiments of the present invention.

In the present invention, algorithms of a data sending apparatus and a data receiving apparatus are improved, so that the data receiving apparatus can automatically identify a modulation format of a received data carrier, and then perform demodulation by using a demodulation algorithm corresponding to the modulation format, thereby implementing adaptive receiving for data carriers in various modulation formats. A data carrier in the present invention may be a data packet (for example, an optical burst packet) transmitted by using light, a data packet (for example, a microwave data packet) transmitted by using an electromagnetic wave, or the like. For simplicity, mostly, an optical burst packet is used as an example for description in the following.

For an optical burst packet, in a DSP algorithm of a coherent burst receiver, channel estimation and equalization are performed based on a training sequence, a modulation format for a signal is transparent, and theoretically, receiving for multiple modulation formats can be supported. In an entire DSP algorithm procedure, only a CR (Carrier Recovery, carrier recovery) module and a Decision (decision) module in the last part are related to a modulation format. It is very difficult for a receiver to automatically determine, by using only a received optical burst packet, which modulation format or what manner needs to be used to perform CR and Decision. The present invention is used to resolve this problem, so that a receiving apparatus can learn a modulation format of a received optical burst packet, and therefore perform CR and Decision by using a corresponding algorithm.

A basic idea of the present invention is introducing a label used for identifying a modulation format of an optical burst packet into a header of this optical burst packet, and adding a label detecting module before a CR module in a DSP procedure to read modulation format information carried in the label.

According to the data sending and receiving methods and apparatuses and the system in the present invention, receiving apparatus, the receiving apparatus can accurately acquire modulation formats of various optical burst packets, and therefore perform processing by using corresponding CR and Decision algorithms. However, a label herein is different from a conventional label, which is because it is required that information included in the label can be read before passing through a CR module and a Decision module (at this time, phase information of data is not recovered yet); therefore, special design is required.

Specific implementation manners of the present invention are further described below in detail with reference to the accompanying drawings and embodiments. The following embodiments are intended to describe the present invention, but are not intended to limit the scope of the present invention.

Embodiment 1

FIG. 1 is a flowchart of a data sending method according to Embodiment 1 of the present invention. As shown in FIG. 1, the data sending method includes:

110: Generate a series of constellation points including label information.

Specifically, the label information is a sequence indicated by polar radius values of multiple labeled constellation points at a pre-determined location and in the series of constellation points, the sequence is a sequence corresponding to a modulation scheme of a constellation point, except the multiple labeled constellation points, in the series of constellation points, different modulation schemes correspond to different sequences, a polar radius value of each labeled constellation point in the multiple labeled constellation points indicates a first numerical value or a second numerical value, and the sequence is a sequence including the first numerical value and/or the second numerical value.

The multiple labeled constellation points are constellation points selected from the series of constellation points to indicate the label information. A polar radius value of a constellation point is a distance between the constellation point and a center of a constellation diagram, where the center of the constellation diagram is an origin of an orthogonal coordinate of a constellation diagram. Therefore, the polar radius values of the labeled constellation points are polar radius values, in a polar coordinate using the origin of the orthogonal coordinate of the constellation diagram as a pole, of the labeled constellation points. The first numerical value may be "1", and the second numerical value may be "0", and vice versa; in this way, the sequence is a bit sequence including "1"s and/or "0"s.

120: Add the series of constellation points to a data carrier.

Specifically, when the data carrier is an optical burst packet, a frame structure of the optical burst packet is shown in the following Table 1, where Ax is a frame header locating field, and used for storing a frame header locating training sequence; Bx is a channel estimation field, and used for storing a channel estimation training sequence; Lx is a label field, and used for storing the label information; and Data Block is a data block field, and used for storing valid data. That is, the labeled constellation points corresponding to the label information are carried in the label field Lx, and a constellation point other than the multiple labeled constellation points is carried in a field other than the label field Lx. In addition, the label field Lx may also be set between the frame header locating field Ax and the first channel estimation field Bx, or may be set at another location of the optical burst packet, for example, the label field Lx is set behind a data block field Data Block. It is just that when the label field Lx is set before all data block fields Data Blocks, it is more helpful to determine demodulation formats of all the data block fields Data Blocks in advance, and easier to implement the method of the present invention.

TABLE 1

Example of frame structure of optical burst packet

| Ax | Bx | Lx | Data Block | Bx | Data Block | Bx | Data Block | ... |
|----|----|----|----|----|----|----|----|----|

130: Send the data carrier.

Specifically, when the data carrier is an optical burst packet, the optical burst packet is sent through an optical channel.

It can be seen that, some constellation points of an original signal are still used in modulation of the label information, so as to keep a hardware structure of a data sending apparatus unchanged and keep signal transmission performance unaffected at the same time. The label information is indicated by using only the polar radius values of the labeled constellation points, so as to read carried information before a CR module of a receiving apparatus; therefore, the labeled constellation points may be modulated by using an ASK amplitude shift keying format.

An optical burst packet is still used as an example. When a modulation format of the optical burst packet is PSK, such as BPSK or QPSK, all constellation points are on a same circle, and therefore there is only one polar radius value, and a code corresponding to the polar radius value can only have one value; then for the moment, label information of a PSK signal is all encoded into high-order bits, for example, three-bit label information is encoded into (1, 1, 1). Because for the PSK signal, carrier recovery may be performed by using a same CR module during DSP of a receiver, and whether the modulation format is BPSK or QPSK (the two are commonly used) may be further determined by using an algorithm, using same label information is feasible in technical implementation.

Figure 2:
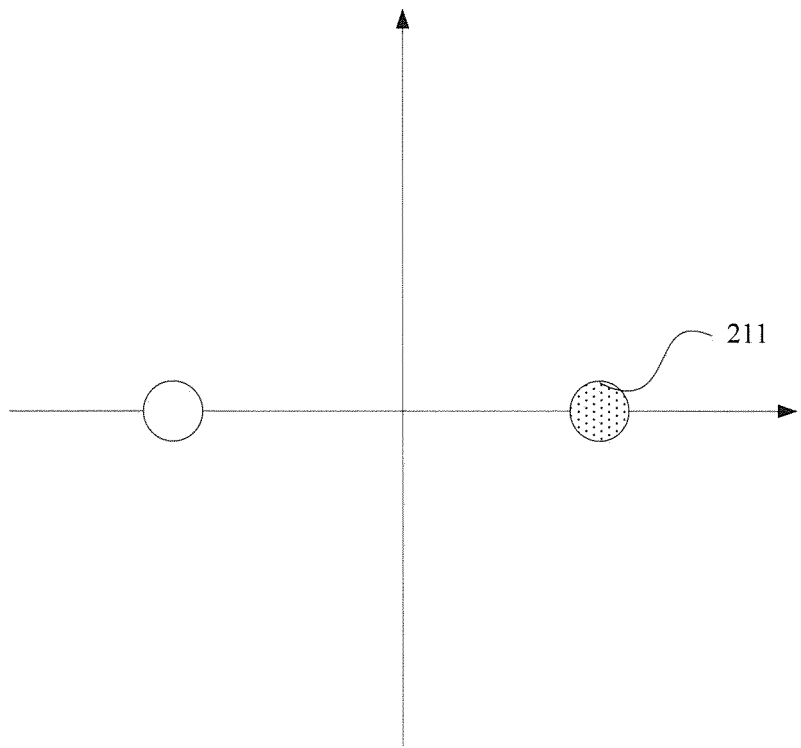
FIG. 2 is a constellation diagram corresponding to label information when a modulation format of an optical burst packet is BPSK.
Figure 3:
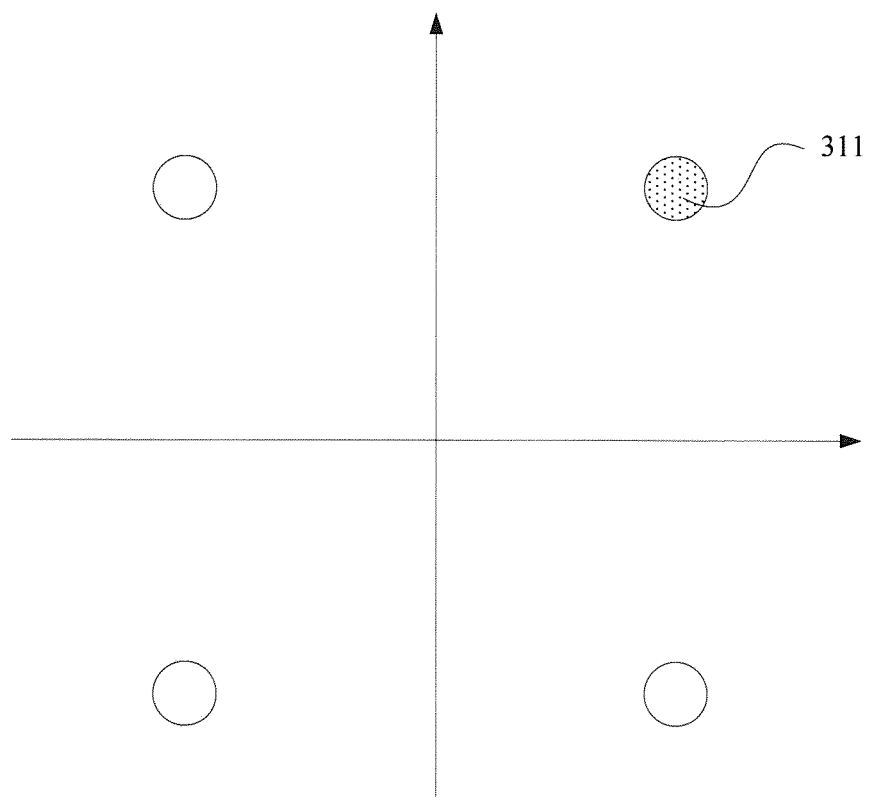
FIG. 3 is a constellation diagram corresponding to label information when a modulation format of an optical burst packet is QPSK.
Figure 4:
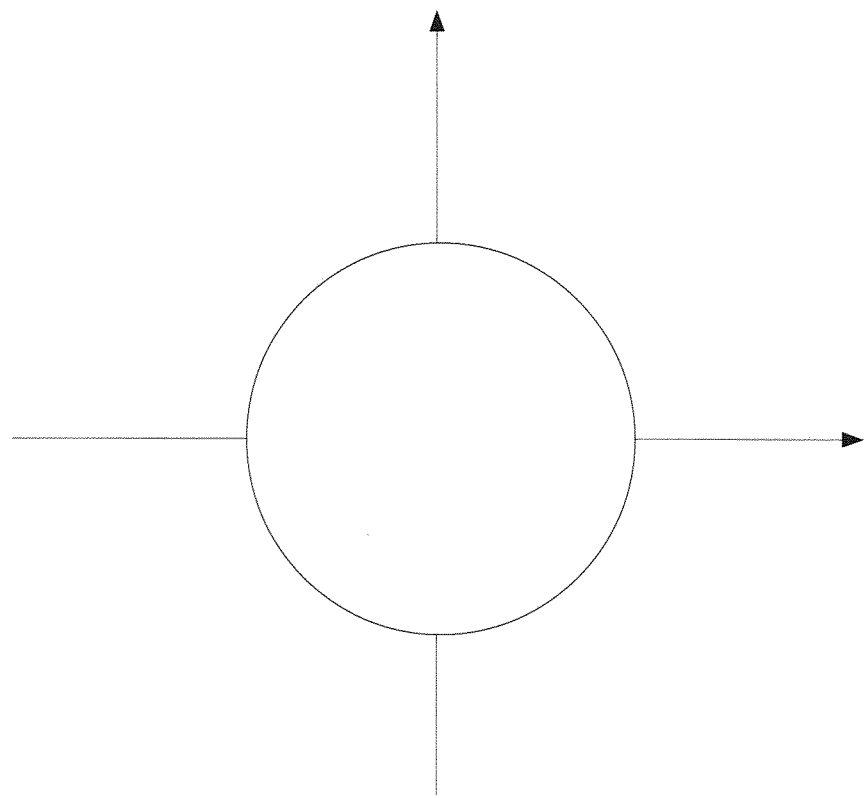
FIG. 4 is a schematic diagram of label information received by a receiving apparatus when a modulation format of an optical burst packet is BPSK.

FIG. 2 is a constellation diagram corresponding to label information when a modulation format of an optical burst packet is BPSK, where both circles represent constellation points corresponding to original data, and a filled circle represents a constellation point selected to indicate label information, that is, a labeled constellation point. Assuming that a code of three-bit label information corresponding to BPSK is (1, 1, 1), two components of a constellation point corresponding to the label information may be I (2, 2, 2) and Q (0, 0, 0), that is, three bits of the label information all correspond to a first constellation point 211. FIG. 3 is a constellation diagram corresponding to label information when a modulation format of an optical burst packet is QPSK, where all circles represent constellation points corresponding to original data, and a filled circle represents a constellation point selected to indicate label information. Assuming that a code of three-bit label information corresponding to QPSK is (1, 1, 1), two components of a constellation point corresponding to the label information may be I (2, 2, 2) and Q (2, 2, 2), that is, three bits of the label information all correspond to a second constellation point 311. FIG. 4 is a schematic diagram of label information received by a receiving apparatus when a modulation format of an optical burst packet is BPSK. Because when a modulation format of an optical burst packet is BPSK, three-bit label information corresponds to a same constellation point and has a same polar radius value, constellation points corresponding to three-bit label information received by a receiving system fall on a same circle, and may be all read as "1", that is, (1, 1, 1) is obtained. A case of label information received by a receiving apparatus when a modulation format of an optical burst packet is QPSK is similar to the case of the label information received by the receiving apparatus when a modulation format of an optical burst packet is BPSK, and is not separately described.

When a modulation format of an optical burst packet is QAM, constellation points in the optical burst packet have more than one polar radius value, and accordingly any two constellation points having different polar radius values may be selected to indicate label information. It may be set that a code corresponding to a constellation point having a larger polar radius value is 1 and a code corresponding to a constellation point having a smaller polar radius value is 0; and vice versa. For simplicity, in this embodiment, description is made by using the former assumption as an example.

Figure 5:
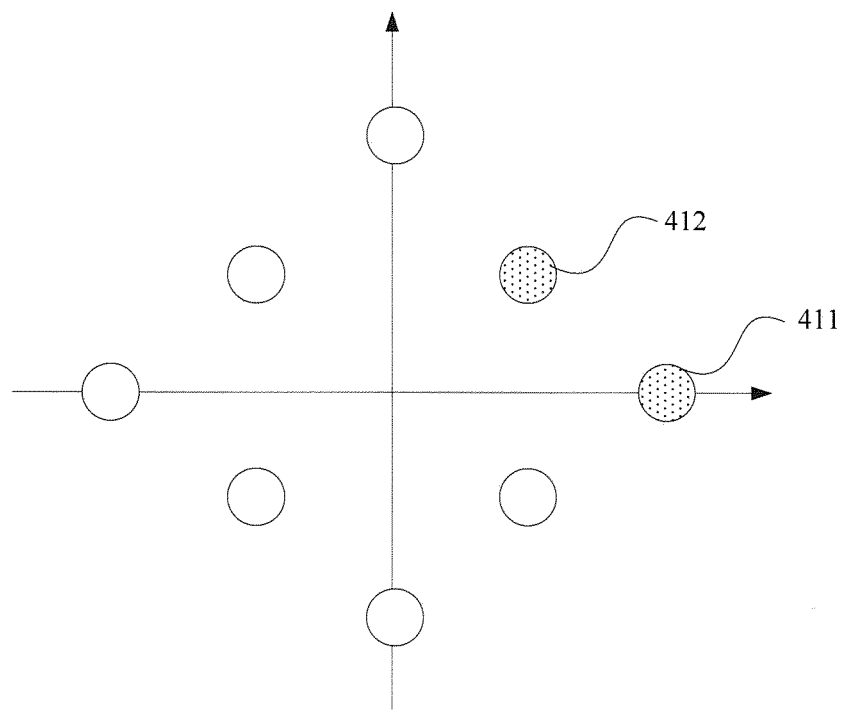
FIG. 5 is a constellation diagram corresponding to label information when a modulation format of an optical burst packet is 8QAM.
Figure 6:
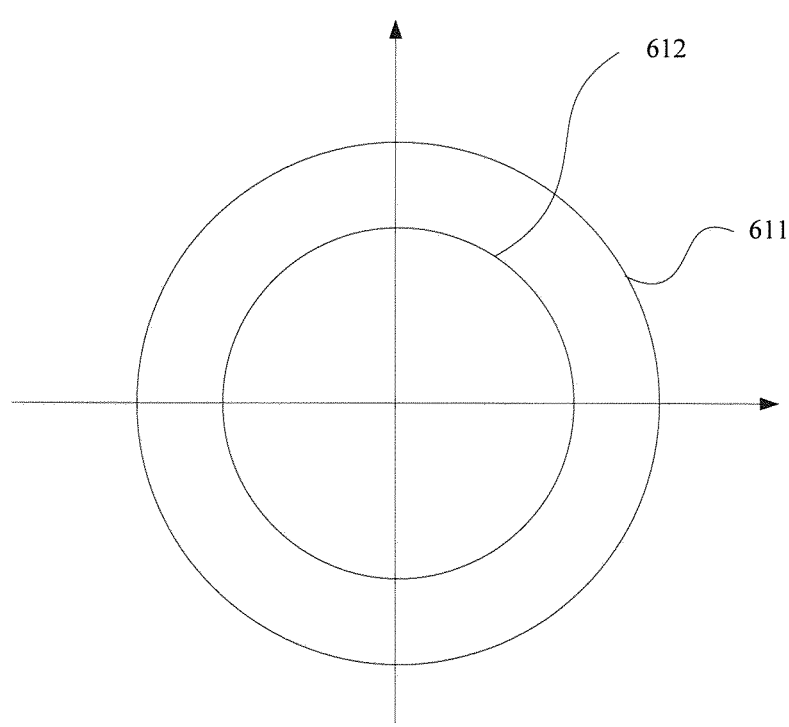
FIG. 6 is a schematic diagram of label information received by a receiving apparatus when a modulation format of an optical burst packet is 8QAM.

FIG. 5 is a constellation diagram corresponding to label information when a modulation format of an optical burst packet is 8QAM, where all circles represent constellation points corresponding to original data, and a filled circle represents a constellation point selected to indicate label information. Assuming that a code of three-bit label information corresponding to 8QAM is (1, 1, 0), two components of a constellation point corresponding to the label information may be I (2, 2, 1) and Q (0, 0, 1), that is, the first two bits of the label information correspond to a third constellation point 411, and the third bit corresponds to a fourth constellation point 412. FIG. 6 is a schematic diagram of label information received by a receiving apparatus when a modulation format of an optical burst packet is 8QAM, where a constellation point corresponding to label information of the first bit falls on a first outer circle 611, a constellation point corresponding to label information of the second bit also falls on the first outer circle 611, a constellation point corresponding to label information of the third bit falls on a first inner circle 612, and a code (1, 1, 0) of three-bit label information may be obtained.

Figure 7:
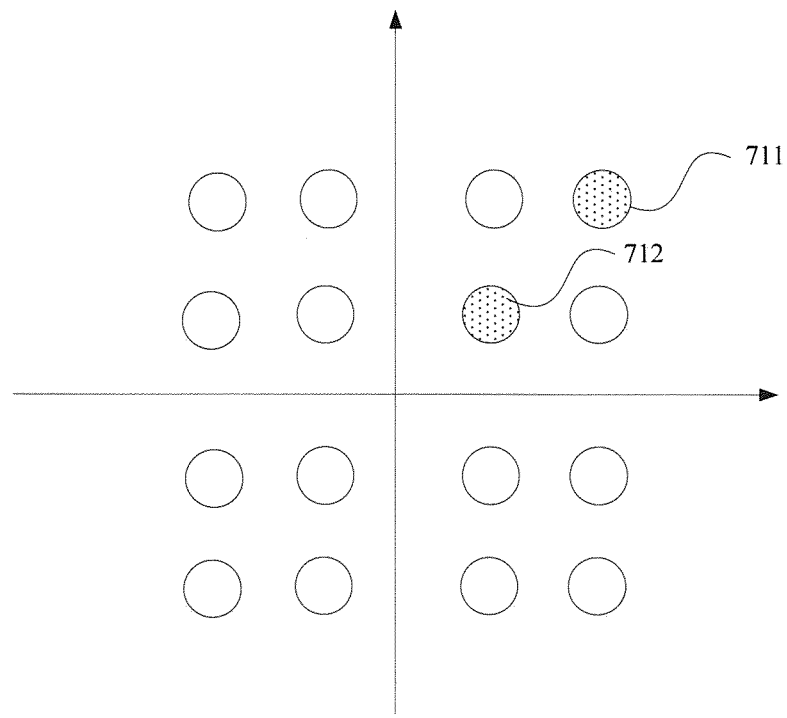
FIG. 7 is a constellation diagram corresponding to label information when a modulation format of an optical burst packet is 16QAM.
Figure 8:
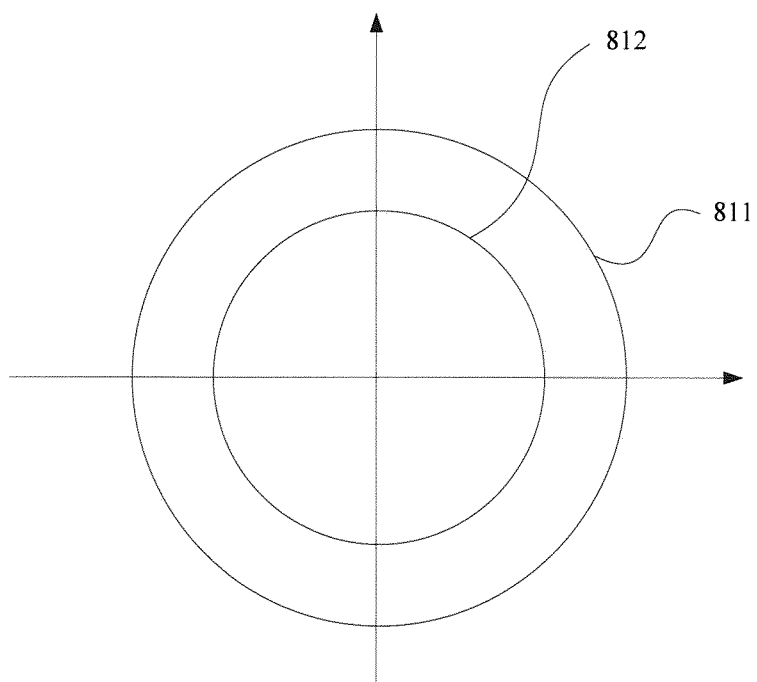
FIG. 8 is a schematic diagram of label information received by a receiving apparatus when a modulation format of an optical burst packet is 16QAM.

FIG. 7 is a constellation diagram corresponding to label information when a modulation format of an optical burst packet is 16QAM, where all circles represent constellation points corresponding to original data, and a filled circle represents a constellation point selected to indicate label information. Assuming that a code of three-bit label information corresponding to 16QAM is (1, 0, 0), two components of a constellation point corresponding to the label information may be I (2, 1, 1) and Q (2, 1, 1), that is, the first bit of the label information corresponds to a fifth constellation point 711, and the last two bits correspond to a sixth constellation point 712. FIG. 8 is a schematic diagram of label information received by a receiving apparatus when a modulation format of an optical burst packet is 16QAM, where a constellation point corresponding to label information of the first bit falls on a second outer circle 811, constellation points corresponding to label information of the last two bits both fall on a second inner circle 812, and a code (1, 0, 0) of three-bit label information may be obtained.

In addition, when there are relatively many modulation formats requiring encoding, a bit quantity of label information may be further increased to meet the requirement, and moreover, the label information may be modulated in a single polarization direction or two polarization directions of light.

Embodiment 2

Figure 9:
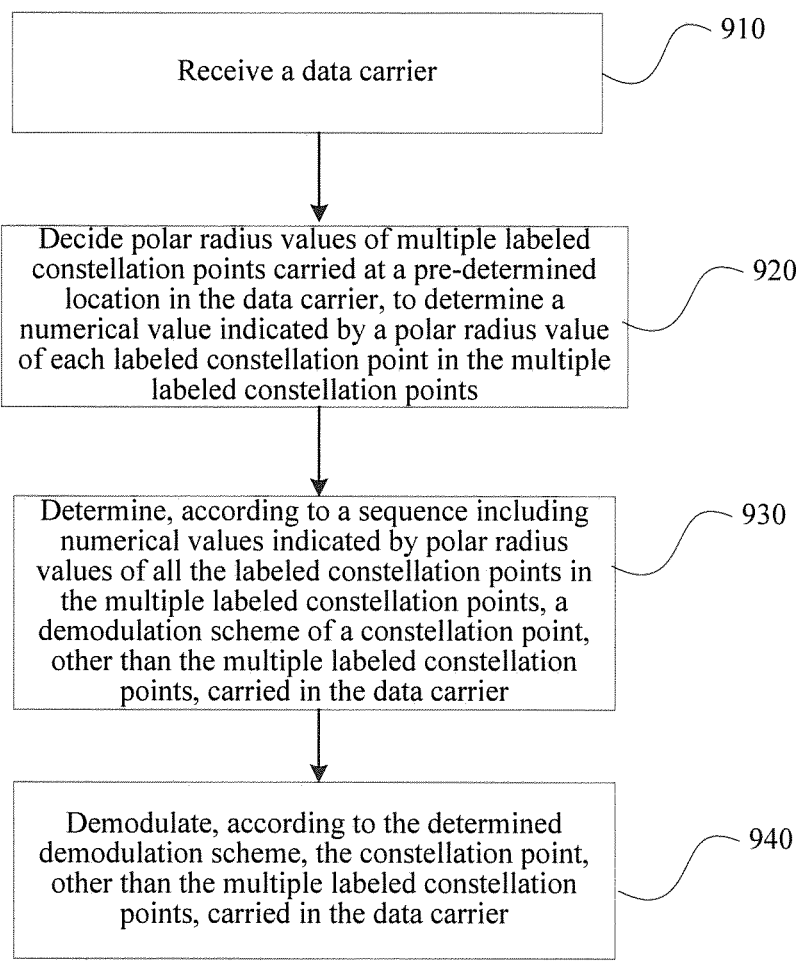
FIG. 9 is a flowchart of a data receiving method according to Embodiment 2 of the present invention.

FIG. 9 is a flowchart of a data receiving method according to Embodiment 2 of the present invention. As shown in FIG. 9, the data receiving method includes:

910: Receive a data carrier.

Specifically, it may be assumed in this embodiment that the received data carrier is an optical burst packet.

920: Decide polar radius values of multiple labeled constellation points carried at a pre-determined location in the data carrier, to determine a numerical value indicated by a polar radius value of each labeled constellation point in the multiple labeled constellation points.

Step 920 specifically includes:

921: Obtain a location of each labeled constellation point carried at the pre-determined location in the data carrier.

922: Obtain a distance between each labeled constellation point and a center point of a constellation diagram according to the location of each labeled constellation point.

923: Determine, according to the distance between each labeled constellation point and the center point of the constellation diagram, whether each labeled constellation point falls on a first circle or a second circle, where the first circle and the second circle are concentric circles using the center point of the constellation diagram as a circle center, and a radius of the first circle is greater than a radius of the second circle.

In step 923, because of existence of an error, a labeled constellation point may not exactly fall on the first circle or the second circle. In this case, the distance between each labeled constellation point and the center point of the constellation diagram may be compared with a pre-determined threshold. If the distance is greater than the pre-determined threshold, it is considered that the labeled constellation point falls on the first circle; otherwise, it is considered that the labeled constellation point falls on the second circle.

924: When a labeled constellation point in the multiple labeled constellation points falls on the first circle, determine that a numerical value indicated by a polar radius value of the labeled constellation point is a first numerical value, and when a labeled constellation point in the multiple labeled constellation points falls on the second circle, determine that a numerical value indicated by a polar radius value of the labeled constellation point is a second numerical value.

In addition, besides the decision method of step 921 to step 924, step 920 may also be implemented in a table query manner, that is, after the distance between each labeled constellation point and the center point of the constellation diagram is obtained, a decision table is queried, where the decision table recodes a distance range corresponding to the first numerical value and a distance range corresponding to the second numerical value. The numerical value indicated by the polar radius value of each labeled constellation point can be determined by querying the decision table.

Principles of the foregoing two decision methods are similar, and the methods may be selected for use according to an actual application situation.

930: Determine, according to a sequence including numerical values indicated by polar radius values of all the labeled constellation points in the multiple labeled constellation points, a demodulation scheme of a constellation point, other than the multiple labeled constellation points, carried in the data carrier, where different demodulation schemes correspond to different sequences.

Step 930 specifically includes:

931: Sort, in a receiving-time order, the numerical values indicated by the polar radius values of all the labeled constellation points in the multiple labeled constellation points, to obtain the sequence.

932: Query a demodulation scheme table according to the sequence, to determine, according to a query result, the demodulation scheme of the constellation point, other than the multiple labeled constellation points, carried in the data carrier.

The demodulation scheme table records label information and a corresponding demodulation scheme, for example, a demodulation scheme corresponding to label information (1, 0, 0) is 16QAM, and a demodulation scheme corresponding to label information (1, 1, 0) is 8QAM.

In addition, because of existence of noise, an error may exist in the received sequence; to correct the error, on a data sending apparatus side, a label field may include a pre-determined quantity of pieces of the label information that are the same may be included in a label field, and in this case, the received sequence includes the pre-determined quantity of pieces of the label information, and steps after step 931 are:

932': Perform an exclusive OR operation on the sequence and different standard sequences, and sum bits of results of the exclusive OR operation, to obtain a standard sequence having a minimum summation result.

The different standard sequences correspond to different demodulation schemes.

Assuming that a standard sequence corresponding to PSK is S4=(1 1 1 1 1 1 1 1 1 1 1 1 1 1 1), that a standard sequence corresponding to 8QAM is S8=(1 1 0 1 1 0 1 1 0 1 1 0 1 1 0), that a standard sequence corresponding to 16QAM is S16=(1 0 0 1 0 0 1 0 0 1 0 0 1 0 0), and that the received sequence is SR=(1 0 0 1 1 0 1 1 0 1 1 1 1 1 0), which is obtained because two bits in the label sequence corresponding to 8QAM are erroneously transmitted, an operation and decision process is as follows:

SR XOR S4=(0 0 0 0 1 0 0 1 0 0 1 1 0 1 0), where the sum of bits is 5;

SR XOR S8=(0 1 0 0 0 0 0 0 0 0 0 1 0 0 0), where the sum of bits is 2; and

SR XOR S16=(0 1 1 0 0 1 0 0 1 0 0 0 0 0 1), where the sum of bits is 5.

Therefore, an obtained standard sequence having a minimum summation result is S8=(1 1 0 1 1 0 1 1 0 1 1 0 1 1 0).

Through the foregoing error correction processing, a problem that a bit error occurs in a signal transmission process due to impact of a factor such as noise can be resolved. In addition, error correction processing may also be performed on the received label information by using another error correction method, and the present invention is not limited to the foregoing error correction method.

933: Determine, according to the standard sequence having the minimum summation result, the demodulation scheme of the constellation point, other than the multiple labeled constellation points, carried in the data carrier.

Specifically, according to a correspondence between the standard sequences and demodulation schemes, a demodulation scheme corresponding to the standard sequence having the minimum summation result, that is, the demodulation scheme of the constellation point other than the multiple labeled constellation points, may be obtained.

In the foregoing assumption, the obtained standard sequence having the minimum summation result is S8, and then it may be determined that the constellation point, other than the multiple labeled constellation points, carried in the data carrier should be demodulated by using 8QAM.

Through the foregoing error correction processing, a problem that a bit error occurs in a signal transmission process due to impact of a factor such as noise can be resolved. In addition, error correction processing may also be performed on the received label information by using another error correction method, and the present invention is not limited to the foregoing error correction method.

940: Demodulate, according to the determined demodulation scheme, the constellation point, other than the multiple labeled constellation points, carried in the data carrier.

Embodiment 3

Figure 10:
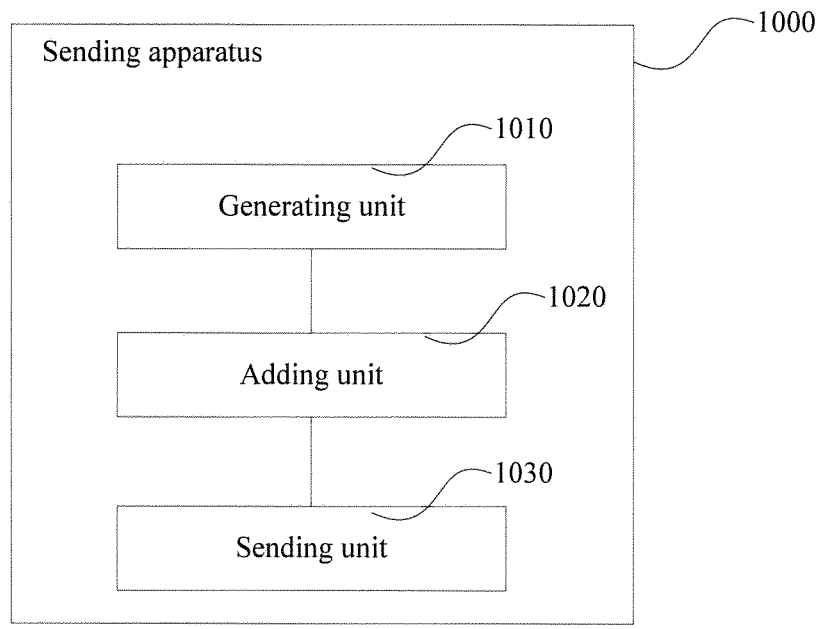
FIG. 10 is a schematic structural diagram of modules of a data sending apparatus according to Embodiment 3 of the present invention.

FIG. 10 is a schematic structural diagram of modules of a data sending apparatus according to Embodiment 3 of the present invention. As shown in FIG. 10, the optical data sending apparatus 1000 includes: a generating unit 1010, an adding unit 1020, and a sending unit 1030.

The generating unit 1010 is configured to generate a series of constellation points including label information, where the label information is a sequence indicated by polar radius values of multiple labeled constellation points at a pre-determined location and in the series of constellation points, the sequence is a sequence corresponding to a modulation scheme of a constellation point, except the multiple labeled constellation points, in the series of constellation points, different modulation schemes correspond to different sequences, a polar radius value of each labeled constellation point in the multiple labeled constellation points indicates a first numerical value or a second numerical value, and the sequence is a sequence including the first numerical value and/or the second numerical value.

The labeled constellation points may be modulated by using ASK amplitude shift keying.

The adding unit 1020 is configured to add the series of constellation points to a data carrier.

When the data carrier is an optical burst packet, the label information is preferably set in a label field of the optical burst packet, and the label field is located behind a frame header locating field and set before all data block fields. Moreover, the label field preferably includes a pre-determined quantity of pieces of the label information that are the same, so as to facilitate error correction processing performed on a receiving apparatus side.

The sending unit 1030 is configured to send the data carrier.

Embodiment 4

Figure 11:
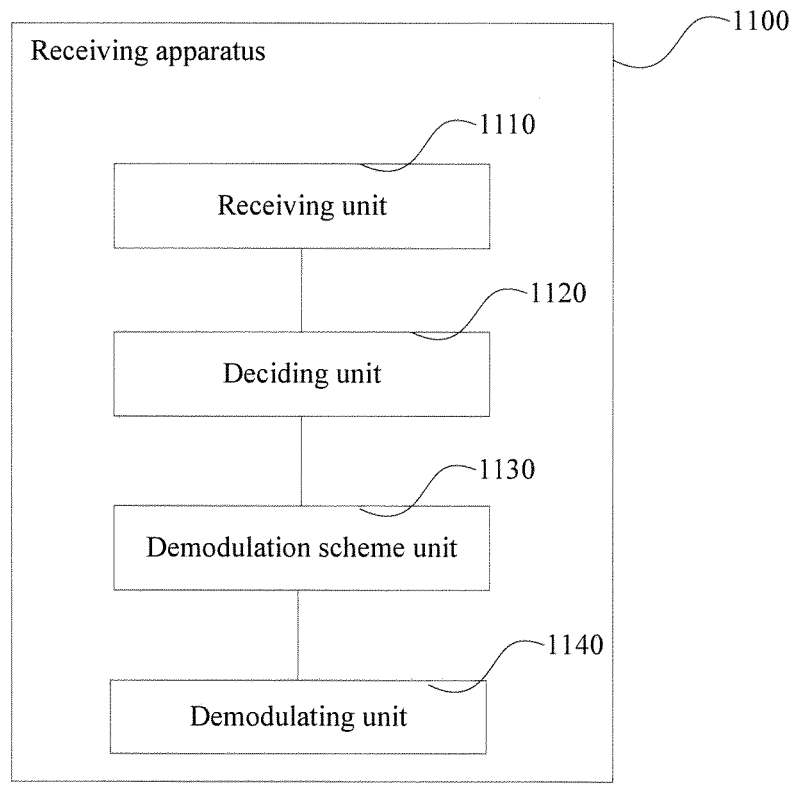
FIG. 11 is a schematic structural diagram of modules of an optical burst packet receiving apparatus according to Embodiment 4 of the present invention.

FIG. 11 is a schematic structural diagram of modules of an optical burst packet receiving apparatus according to Embodiment 4 of the present invention. The data receiving apparatus 1100 includes: a receiving unit 1110, a deciding unit 1120, a demodulation scheme unit 1130, and a demodulating unit 1140.

The receiving unit 1110 is configured to receive a data carrier.

The deciding unit 1120 is configured to decide polar radius values of multiple labeled constellation points carried at a pre-determined location in the data carrier, to determine a numerical value indicated by a polar radius value of each labeled constellation point in the multiple labeled constellation points.

Figure 12:
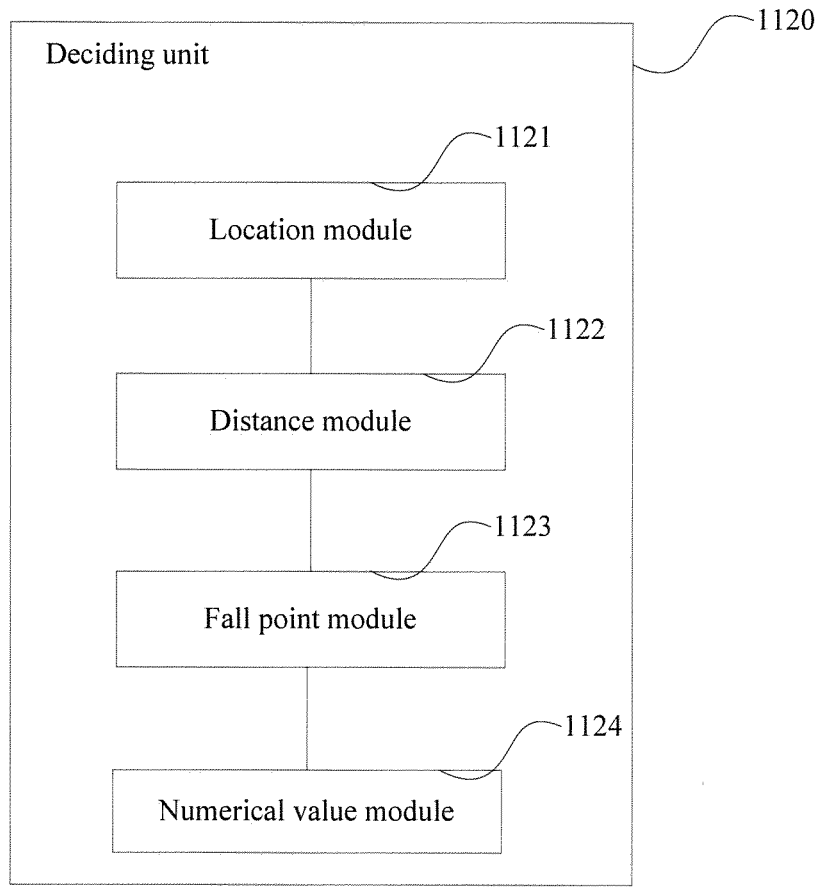
FIG. 12 is a schematic structural diagram of modules of a deciding unit according to Embodiment 4 of the present invention.

Referring to FIG. 12, the deciding unit 1120 includes:

a location module 1121, configured to obtain a location of each labeled constellation point carried at the pre-determined location in the data carrier;

a distance module 1122, configured to obtain a distance between each labeled constellation point and a center point of a constellation diagram according to the location of each labeled constellation point;

a fall point module 1123, configured to determine, according to the distance between each labeled constellation point and the center point of the constellation diagram, whether each labeled constellation point falls on a first circle or a second circle, where the first circle and the second circle are concentric circles using the center point of the constellation diagram as a circle center, and a radius of the first circle is greater than a radius of the second circle; and a numerical value module 1124, configured to determine, according to whether each labeled constellation point falls on the first circle or the second circle, the numerical value indicated by the polar radius value of each labeled constellation point in the multiple labeled constellation points. The numerical value module 1124 is specifically configured to: when a labeled constellation point in the multiple labeled constellation points falls on the first circle, determine that a numerical value indicated by a polar radius value of the labeled constellation point is a first numerical value, and when a labeled constellation point in the multiple labeled constellation points falls on the second circle, determine that a numerical value indicated by a polar radius value of the labeled constellation point is a second numerical value.

The demodulation scheme unit 1130 is configured to determine, according to a sequence including numerical values indicated by polar radius values of all the labeled constellation points in the multiple labeled constellation points, a demodulation scheme of a constellation point, other than the multiple labeled constellation points, carried in the data carrier, where different demodulation schemes correspond to different sequences.

Figure 13A:
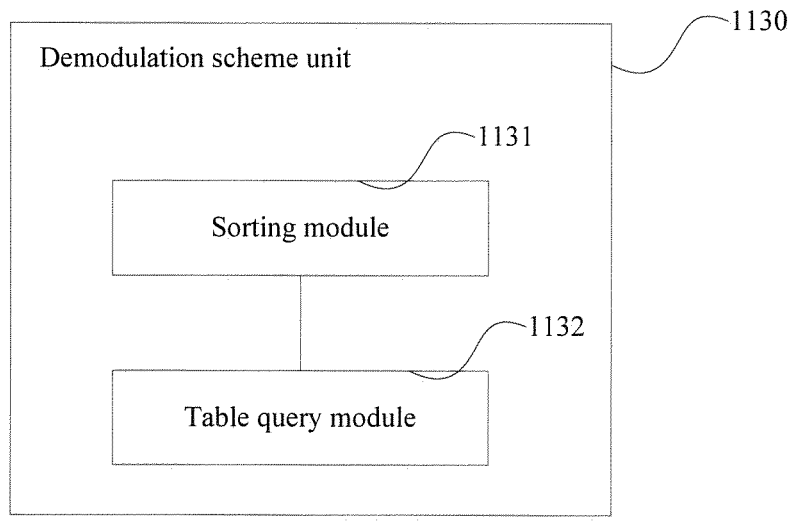
FIG. 13a is a schematic structural diagram of modules of a demodulation scheme unit according to Embodiment 4 of the present invention.

Referring to FIG. 13*a*, the demodulation scheme unit 1130 includes:

a sorting module 1131, configured to sort, in a receiving-time order, the numerical values indicated by the polar radius values of all the labeled constellation points in the multiple labeled constellation points, to obtain the sequence; and a table query module 1132, configured to query a demodulation scheme table according to the sequence, to determine, according to a query result, the demodulation scheme of the constellation point, other than the multiple labeled constellation points, carried in the data carrier.

Figure 13B:
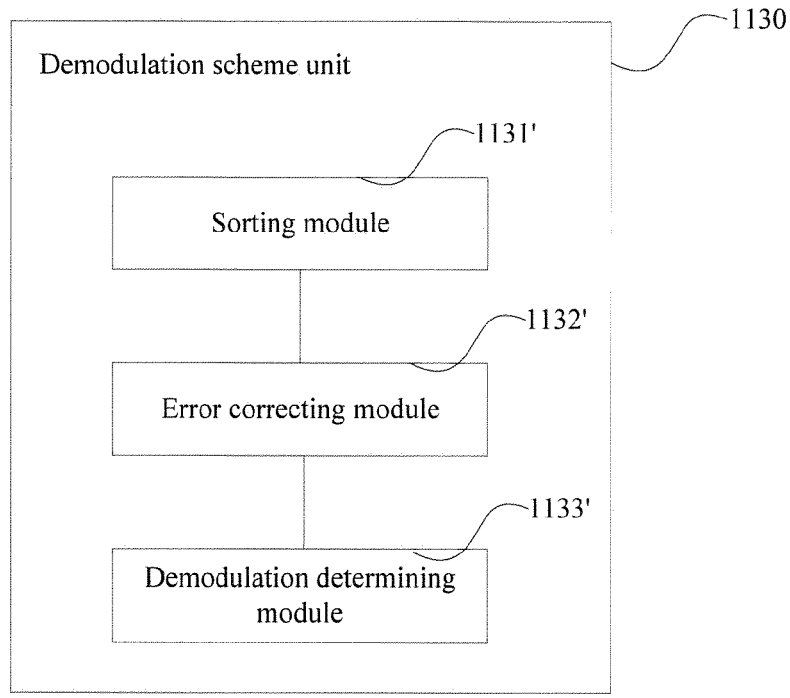
FIG. 13b is a schematic structural diagram of modules of another demodulation scheme unit according to Embodiment 4 of the present invention.

Referring to FIG. 13*b*, in another embodiment of the present invention, the demodulation scheme unit 1130 includes:

a sorting module 1131', configured to sort, in a receiving-time order, the numerical values indicated by the polar radius values of all the labeled constellation points in the multiple labeled constellation points, to obtain the sequence;

an error correcting module 1132', configured to perform an exclusive OR operation on the sequence and different standard sequences, and sum bits of results of the exclusive OR operation, to obtain a standard sequence having a minimum summation result; and a demodulation determining module 1133', configured to determine, according to the standard sequence having the minimum summation result, the demodulation scheme of the constellation point, other than the multiple labeled constellation points, carried in the data carrier.

The demodulating unit 1140 is configured to demodulate, according to the determined demodulation scheme, the constellation point, other than the multiple labeled constellation points, carried in the data carrier.

In addition, the receiving apparatus 1100 further includes: a sampling unit configured to perform sampling again to obtain two sampling points/symbols, an error estimating unit configured to perform optical front-end error estimation, a correcting unit configured for optical front-end correction, a dispersion estimating unit configured for estimation of accumulated dispersion, a dispersion compensating unit configured for dispersion compensation, a coarse-synchronization unit configured for frame header coarse synchronization, a noise compensating unit configured for frame header phase noise compensation, a channel estimating unit configured for channel estimation, a channel equalizing unit configured for channel equalization, a fine-synchronization unit configured for frame header fine synchronization, a clock recovery unit configured for clock recovery, and the like; all of them are not emphases of the present invention, and are not separately described.

Embodiment 5

Figure 14:
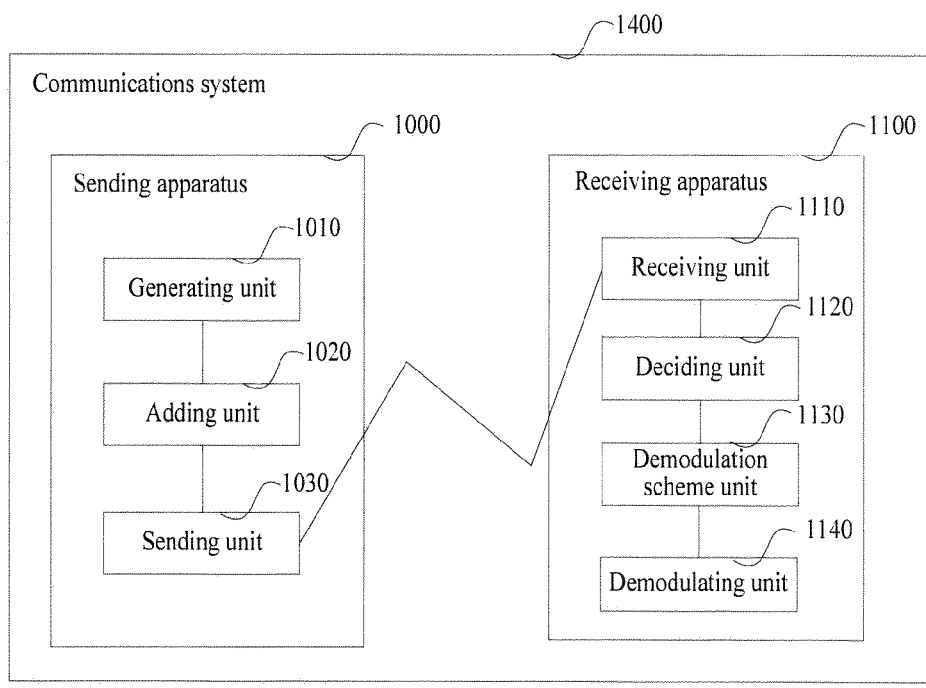
FIG. 14 is a schematic structural diagram of a data communications system according to Embodiment 5 of the present invention.

Referring to FIG. 14, this embodiment of the present invention provides a data communications system, and the communications system 1400 includes the data sending apparatus 1000 in Embodiment 3 and the data receiving apparatus 1100 in Embodiment 4.

For detailed structures of the data sending apparatus 1000 and the data receiving apparatus 1100, refer to Embodiment 3 and Embodiment 4. Details are not repeated herein.

Figure 15:
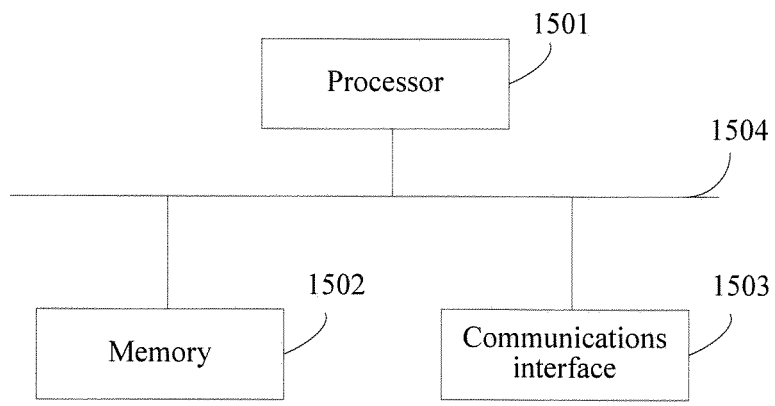
FIG. 15 is a schematic structural diagram of a data sending apparatus implemented based on a computer system.

The data sending apparatus in this embodiment of the present invention may be implemented based on a computer system, and the method shown in FIG. 1 may be implemented by the data sending apparatus based on the computer system. FIG. 15 shows an embodiment of the data sending apparatus implemented based on the computer system. The data sending apparatus in this embodiment may include: a processor 1501, a memory 1502, and a communications interface 1503.

The communications interface 1503 is configured to communicate with the data receiving apparatus. Specifically, the communications interface 1503 is configured to send a data carrier; the memory 1502 is configured to store a program instruction; and the processor 1501 is configured to: after to-be-sent original data is received, invoke the program instruction stored in the memory 1502 to execute the following operations: generating a series of constellation points including label information, where the label information is a sequence indicated by polar radius values of multiple labeled constellation points at a pre-determined location and in the series of constellation points, the sequence is a sequence corresponding to a modulation scheme of a constellation point, except the multiple labeled constellation points, in the series of constellation points, different modulation schemes correspond to different sequences, a polar radius value of each labeled constellation point in the multiple labeled constellation points indicates a first numerical value or a second numerical value, and the sequence is a sequence including the first numerical value and/or the second numerical value; and adding the series of constellation points to the data carrier.

The processor 1501 may be a central processing unit (central processing unit, CPU), an application-specific integrated circuit (application-specific integrated circuit, ASIC), or the like. The data sending apparatus in this embodiment may include a bus 1504. The processor 1501, the memory 1502, and the communications interface 1503 may connect to and communicate with one another by using the bus 1504. The memory 1502 may include an entity having a storage function, such as a random access memory (random access memory, RAM), a read-only memory (read-only memory, ROM), or a magnetic disk.

Figure 16:
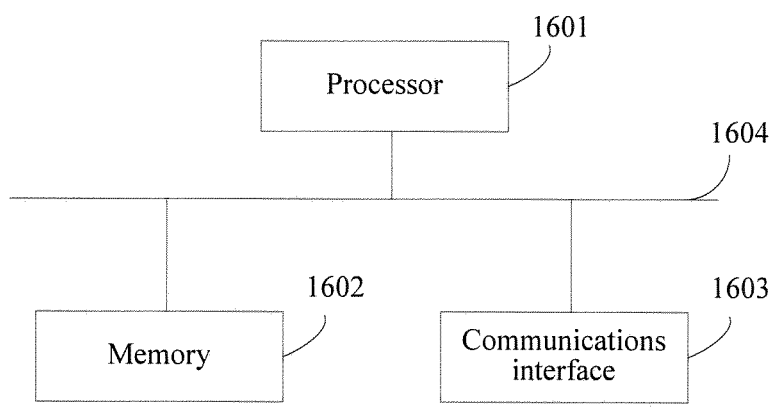
FIG. 16 is a schematic structural diagram of a data receiving apparatus implemented based on a computer system.

The data receiving apparatus in this embodiment of the present invention may be implemented based on a computer system, and the method shown in FIG. 9 may be implemented by the data receiving apparatus based on the computer system. FIG. 16 shows an embodiment of the data receiving apparatus implemented based on the computer system. The data receiving apparatus in this embodiment may include: a processor 1601, a memory 1602, and a communications interface 1603.

The communications interface 1603 is configured to communicate with the data sending apparatus. Specifically, the communications interface 1603 is configured to receive a data carrier; the memory 1602 is configured to store a program instruction; and the processor 1601 is configured to: after the data carrier is received, invoke the program instruction stored in the memory 1602 to execute the following operations: deciding polar radius values of multiple labeled constellation points carried at a pre-determined location in the data carrier, to determine a numerical value indicated by a polar radius value of each labeled constellation point in the multiple labeled constellation points; determining, according to a sequence including numerical values indicated by polar radius values of all the labeled constellation points in the multiple labeled constellation points, a demodulation scheme of a constellation point, other than the multiple labeled constellation points, carried in the data carrier, where different demodulation schemes correspond to different sequences; and demodulating, according to the determined demodulation scheme, the constellation point, other than the multiple labeled constellation points, carried in the data carrier.

The processor 1601 may be a central processing unit (central processing unit, CPU), an application-specific integrated circuit (application-specific integrated circuit, ASIC), or the like. The data receiving apparatus in this embodiment may include a bus 1604. The processor 1601, the memory 1602, and the communications interface 1603 may connect to and communicate with one another by using the bus 1604. The memory 1602 may include an entity having a storage function, such as a random access memory (random access memory, RAM), a read-only memory (read-only memory, ROM), or a magnetic disk.

In the data sending and receiving methods and apparatuses and the system in the embodiments of the present invention, on a data receiving apparatus side: a data carrier is received; polar radius values of multiple labeled constellation points carried at a pre-determined location in the data carrier are decided, to determine a numerical value indicated by a polar radius value of each labeled constellation point in the multiple labeled constellation points; a demodulation scheme of a constellation point, other than the multiple labeled constellation points, carried in the data carrier is determined according to a sequence including numerical values indicated by polar radius values of all the labeled constellation points in the multiple labeled constellation points, where different demodulation schemes correspond to different sequences; and the constellation point, other than the multiple labeled constellation points, carried in the data carrier is demodulated according to the determined demodulation scheme. The demodulation scheme of the constellation point other than the multiple labeled constellation points is transferred by using the polar radius values of the labeled constellation points, so that the data receiving apparatus can receive different-order amplitude modulation signals, and perform processing by using corresponding demodulation formats.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware-only embodiments, software-only embodiments (including firmware, resident software, and the like), or embodiments with a combination of software and hardware, which are referred to as "circuit", "unit", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processing unit in a computer reads computer-readable program code stored in a computer-readable medium, so that the processing unit can perform a function and an action specified in each step or a combination of steps in a flowchart; an apparatus is generated to implement a function and an action specified in each block or a combination of blocks in a block diagram.

All computer-readable program code may be executed on a computer of a user, or some may be executed on a computer of a user as a standalone software package, or some may be executed on a computer of a user while some is executed on a remote computer, or all the code may be executed on a remote computer. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

The present invention discloses data receiving and sending methods and apparatuses and a system, and relates to the field of communications technologies. The data receiving method includes: receiving a data carrier; deciding polar radius values of multiple labeled constellation points carried at a pre-determined location in the data carrier, to determine a numerical value indicated by a polar radius value of each labeled constellation point in the multiple labeled constellation points; determining, according to a sequence including numerical values indicated by polar radius values of all the labeled constellation points in the multiple labeled constellation points, a demodulation scheme of a constellation point, other than the multiple labeled constellation points, carried in the data carrier; and demodulating, according to the determined demodulation scheme, the constellation point, other than the multiple labeled constellation points, carried in the data carrier. According to the data receiving and sending methods and apparatuses and the system, a data receiving apparatus can receive different-order amplitude modulation signals, and perform processing by using corresponding demodulation formats, which is industrially practical.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data receiving method, comprising:
   receiving a data carrier;
   deciding polar radius values of multiple labeled constellation points carried at a pre-determined location in the data carrier, to determine a numerical value indicated by a polar radius value of each labeled constellation point in the multiple labeled constellation points;
   determining, according to a sequence comprising numerical values indicated by polar radius values of all the labeled constellation points in the multiple labeled constellation points, a demodulation scheme of a constellation point, other than the multiple labeled constellation points, carried in the data carrier, wherein different demodulation schemes correspond to different sequences; and
   demodulating, according to the determined demodulation scheme, the constellation point, other than the multiple labeled constellation points, carried in the data carrier.

2. The data receiving method according to claim 1, wherein:
   the polar radius values of the labeled constellation points are distances between the labeled constellation points and a center point of a constellation diagram; and
   deciding polar radius values of multiple labeled constellation points carried at a pre-determined location in the data carrier comprises:
      obtaining a location of each labeled constellation point carried at the pre-determined location in the data carrier,
      obtaining a distance between each labeled constellation point and the center point of the constellation diagram according to the location of each labeled constellation point, and
      determining, according to the distance between each labeled constellation point and the center point of the constellation diagram, whether each labeled constellation point falls on a first circle or a second circle, wherein the first circle and the second circle are concentric circles using the center point of the constellation diagram as a circle center, and a radius of the first circle is greater than a radius of the second circle.

3. The data receiving method according to claim 2, wherein determining a numerical value indicated by a polar radius value of each labeled constellation point in the multiple labeled constellation points comprises:
   when a labeled constellation point in the multiple labeled constellation points falls on the first circle, determining that a numerical value indicated by a polar radius value of the labeled constellation point is a first numerical value; and
   when a labeled constellation point in the multiple labeled constellation points falls on the second circle, determining that a numerical value indicated by a polar radius value of the labeled constellation point is a second numerical value.

4. The data receiving method according to claim 1, wherein determining, according to a sequence comprising numerical values indicated by polar radius values of all the labeled constellation points in the multiple labeled constellation points, a demodulation scheme of a constellation point, other than the multiple labeled constellation points, carried in the data carrier comprises:

sorting, in a receiving-time order, the numerical values indicated by the polar radius values of all the labeled constellation points in the multiple labeled constellation points, to obtain the sequence; and querying a demodulation scheme table according to the sequence, to determine, according to a query result, the demodulation scheme of the constellation point, other than the multiple labeled constellation points, carried in the data carrier.

5. The data receiving method according to claim 1, wherein determining, according to a sequence comprising numerical values indicated by polar radius values of all the labeled constellation points in the multiple labeled constellation points, a demodulation scheme of a constellation point, other than the multiple labeled constellation points, carried in the data carrier comprises:

sorting, in a receiving-time order, the numerical values indicated by the polar radius values of all the labeled constellation points in the multiple labeled constellation points, to obtain the sequence;

performing an exclusive OR operation on the sequence and different standard sequences, and summing bits of results of the exclusive OR operation, to obtain a standard sequence having a minimum summation result; and determining, according to the standard sequence having the minimum summation result, the demodulation scheme of the constellation point, other than the multiple labeled constellation points, carried in the data carrier.

6. A data sending method, comprising:

generating a series of constellation points comprising label information, wherein the label information is a sequence indicated by polar radius values of multiple labeled constellation points at a pre-determined location and in the series of constellation points, the sequence is a sequence corresponding to a modulation scheme of a constellation point, except the multiple labeled constellation points, in the series of constellation points, different modulation schemes correspond to different sequences, a polar radius value of each labeled constellation point in the multiple labeled constellation points indicates a first numerical value or a second numerical value, and the sequence is a sequence comprising the first numerical value and/or the second numerical value;

adding the series of constellation points to a data carrier; and sending the data carrier.

7. The data sending method according to claim 6, wherein:

the data carrier is an optical burst packet; and the label information is set in a label field of the optical burst packet, and the label field is located behind a frame header locating field and set before all data block fields.

8. The data sending method according to claim 7, wherein the label field comprises a pre-determined quantity of pieces of the label information that are the same.

9. The data sending method according to claim 6, wherein the labeled constellation points are modulated by using ASK amplitude shift keying.

10. A data receiving apparatus, comprising:

a memory storing instructions; and a processor coupled to the memory to execute the instructions to:

receive a data carrier, decide polar radius values of multiple labeled constellation points carried at a pre-determined location in the data carrier, to determine a numerical value indicated by a polar radius value of each labeled constellation point in the multiple labeled constellation points, determine, according to a sequence comprising numerical values indicated by polar radius values of all the labeled constellation points in the multiple labeled constellation points, a demodulation scheme of a constellation point, other than the multiple labeled constellation points, carried in the data carrier, wherein different demodulation schemes correspond to different sequences, and demodulate, according to the determined demodulation scheme, the constellation point, other than the multiple labeled constellation points, carried in the data carrier.

11. The data receiving apparatus according to claim 10, wherein:

the polar radius values of the labeled constellation points are distances between the labeled constellation points and a center point of a constellation diagram; and the processor is coupled to the memory to further execute the instructions to:

obtain a location of each labeled constellation point carried at the pre-determined location in the data carrier, obtain a distance between each labeled constellation point and the center point of the constellation diagram according to the location of each labeled constellation point, determine, according to the distance between each labeled constellation point and the center point of the constellation diagram, whether each labeled constellation point falls on a first circle or a second circle, wherein the first circle and the second circle are concentric circles using the center point of the constellation diagram as a circle center, and a radius of the first circle is greater than a radius of the second circle, and determine, according to whether each labeled constellation point falls on the first circle or the second circle, the numerical value indicated by the polar radius value of each labeled constellation point in the multiple labeled constellation points.

12. The data receiving apparatus according to claim 11, wherein the processor is coupled to the memory to further execute the instructions to:

when a labeled constellation point in the multiple labeled constellation points falls on the first circle, determine that a numerical value indicated by a polar radius value of the labeled constellation point is a first numerical value; and when a labeled constellation point in the multiple labeled constellation points falls on the second circle, determine that a numerical value indicated by a polar radius value of the labeled constellation point is a second numerical value.

13. The data receiving apparatus according to claim 10, wherein the processor is coupled to the memory to further execute the instructions to:
sort, in a receiving-time order, the numerical values indicated by the polar radius values of all the labeled constellation points in the multiple labeled constellation points, to obtain the sequence; and
query a demodulation scheme table according to the sequence, to determine, according to a query result, the demodulation scheme of the constellation point, other than the multiple labeled constellation points, carried in the data carrier.

14. The data receiving apparatus according to claim 10, wherein the processor is coupled to the memory to further execute the instructions to:
sort, in a receiving-time order, the numerical values indicated by the polar radius values of all the labeled constellation points in the multiple labeled constellation points, to obtain the sequence;
perform an exclusive OR operation on the sequence and different standard sequences, and sum bits of results of the exclusive OR operation, to obtain a standard sequence having a minimum summation result; and
determine, according to the standard sequence having the minimum summation result, the demodulation scheme of the constellation point, other than the multiple labeled constellation points, carried in the data carrier.

15. A data sending apparatus, comprising:
a memory storing instructions; and
a processor coupled to the memory to execute the instructions to:
generate a series of constellation points comprising label information, wherein the label information is a sequence indicated by polar radius values of multiple labeled constellation points at a pre-determined location and in the series of constellation points, the sequence is a sequence corresponding to a modulation scheme of a constellation point, except the multiple labeled constellation points, in the series of constellation points, different modulation schemes correspond to different sequences, a polar radius value of each labeled constellation point in the multiple labeled constellation points indicates a first numerical value or a second numerical value, and the sequence is a sequence comprising the first numerical value and/or the second numerical value,
add the series of constellation points to a data carrier, and
send the data carrier.

16. The data sending apparatus according to claim 15, wherein:
the data carrier is an optical burst packet; and
the label information is set in a label field of the optical burst packet, and the label field is located behind a frame header locating field and set before all data block fields.

17. The data sending apparatus according to claim 16, wherein the label field comprises a pre-determined quantity of pieces of the label information that are the same.

18. The data sending apparatus according to claim 15, wherein the labeled constellation points are modulated by using ASK amplitude shift keying.

* * * * *